US011565771B2

(12) United States Patent
Boehm et al.

(10) Patent No.: US 11,565,771 B2
(45) Date of Patent: Jan. 31, 2023

(54) ELECTROMECHANICAL DERAILLEUR

(71) Applicant: SRAM DEUTSCHLAND GmbH, Schweinfurt (DE)

(72) Inventors: Robert Boehm, Mainberg (DE); Sebastian Dueweling, Mainberg (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 771 days.

(21) Appl. No.: 16/184,640

(22) Filed: Nov. 8, 2018

(65) Prior Publication Data

US 2019/0144071 A1    May 16, 2019

(30) Foreign Application Priority Data

Nov. 9, 2017   (DE) .................... 10 2017 010 348.8

(51) Int. Cl.
*B62M 9/122*    (2010.01)
*B62M 9/1242*   (2010.01)
*B62M 9/1248*   (2010.01)
*B62M 25/08*    (2006.01)

(52) U.S. Cl.
CPC .......... *B62M 9/122* (2013.01); *B62M 9/1242* (2013.01); *B62M 9/1248* (2013.01); *B62M 25/08* (2013.01)

(58) Field of Classification Search
CPC ...... B62M 9/121; B62M 9/122; B62M 9/124; B62M 9/1242; B62M 9/125; B62M 9/131; B62M 9/132; B62M 9/135; B62M 9/1248

USPC ..................................................... 474/80, 82
See application file for complete search history.

(56) References Cited

U.S. PATENT DOCUMENTS

| | | | | |
|---|---|---|---|---|
| 2004/0014541 | A1* | 1/2004 | Dal Pra .................. | B62M 25/08 474/70 |
| 2004/0116221 | A1* | 6/2004 | Fukuda ................ | B62M 9/1244 474/82 |
| 2014/0148287 | A1* | 5/2014 | Tachibana .............. | B62M 9/134 474/82 |
| 2014/0296009 | A1* | 10/2014 | Suyama ................ | B62M 9/122 474/80 |
| 2015/0111675 | A1* | 4/2015 | Shipman ................ | B62M 25/08 474/82 |
| 2017/0113759 | A1* | 4/2017 | Watarai .................... | B62J 43/30 |
| 2018/0281899 | A1* | 10/2018 | Bernardele ............ | B62M 9/124 |

FOREIGN PATENT DOCUMENTS

| | | |
|---|---|---|
| DE | 102014015365 | 4/2015 |
| DE | 102016002298 | 9/2016 |
| DE | 102016002300 | 9/2016 |

(Continued)

*Primary Examiner* — Gene O Crawford
*Assistant Examiner* — Emily R Kincaid

(57) ABSTRACT

The invention relates to an electromechanical derailleur for mounting on a rear wheel axis. The derailleur has a stationary element, a pivoting mechanism, a movable element having a chain guide arrangement, and a gearing housing. The gearing housing receives an electromechanical drive for driving the pivoting mechanism. The stationary element defines a housing void in which the gearing housing is disposed, and has a fastener for a power source. The power source is fastened to the stationary element such that said power source is electrically connected to the electromechanical drive in the gearing housing.

19 Claims, 11 Drawing Sheets

(56) References Cited

FOREIGN PATENT DOCUMENTS

| DE | 102016010845 | 4/2017 |
| EP | 1010613 | 6/2000 |
| EP | 1396419 | 3/2004 |
| EP | 1657154 | 5/2006 |
| EP | 1752373 | 2/2007 |

\* cited by examiner

ELECTROMECHANICAL DERAILLEUR

This application claims priority to, and/or the benefit of, German patent application DE 10 2017 010 348.8 filed Nov. 9, 2017.

FIELD OF INVENTION

The invention relates to an electromechanical derailleur for assembly on a rear wheel axis of a bicycle.

BACKGROUND

Various electromechanical derailleurs are known from the prior art. EP 1 396 419 shows an electromechanical derailleur which is supplied with electrical current by way of a cable. A first base element (B knuckle) of the derailleur is releasably fastened to the bicycle frame by way of a screw (B bolt). A gearbox having a gearing is disposed between the first base element and a second base element. The gearbox is penetrated by a plurality of pins which fix the gearbox relative to the base element. The pins prevent any slippage of the gearbox relative to the base element. A disadvantage of this construction is that additional components in the form of pins are required in order for the gearbox to be fixed. The pins have to be routed through the gearbox in a complex manner to avoid colliding with the functional parts of the gearing. Moreover, the pin openings in the housing reduce the seal of the housing. Assembling the derailleur is complex and time intensive. A further disadvantage is that the electric derailleur has to be provided with electricity by way of a cable.

Electromechanical derailleurs having batteries are also known, said batteries being attached close to or directly on the derailleur. The drive unit of the derailleur must be positioned in the region of a base element (B knuckle) or in the region of a movable element (P knuckle) so as to be spaced apart from the battery. The battery is connected to the drive unit of the derailleur by way of an electric cable and provides said drive unit with electricity. Due to the spacing between the battery and the drive unit, a cable-free supply of energy to the drive unit is not possible: a power cable must bridge the space.

An electric derailleur is also known from DE 10 2014 015 365 (cf. FIG. 2), said electric derailleur having a base element which can be attached along an assembly axis on a bicycle. A movable element has a chain guide arrangement attached thereto. The derailleur is installed such that the pivot axes of the movable element are aligned so as to be substantially perpendicular to the assembly axis. A battery is disposed on the base element. The drive unit, composed of a gearing and electric motor, is disposed in the base element. A battery is electrically connected to the motor. The motor actuates the gearing to move the movable element relative to the base element. The disadvantage of this embodiment is that the drive unit is integrated in the base element. The base element simultaneously serves as the gearbox, thus complex manufacturing and assembling is required. Defective parts may require the entire base element, including the drive unit, to be replaced.

Thus, there is a necessity to provide a rear derailleur which overcomes the disadvantages of the known derailleurs. This end is achieved by way of an electromechanical derailleur for assembly on a rear wheel axis of a bicycle.

SUMMARY

In an embodiment, an electromechanical derailleur for assembly on a rear wheel axis of a bicycle is provided. The derailleur has a stationary element, a pivoting mechanism, a movable element having a chain guide arrangement, and a gearing housing. The stationary element is releasably mounted on a bicycle frame. The pivoting mechanism connects the stationary element to the movable element. The pivoting mechanism enables movement of the movable element relative to the stationary element. The gearing housing receives an electromechanical drive for driving the pivoting mechanism. The gearing housing is at least in part disposed in a housing void defined by the stationary element. A power source is fastened to the stationary element such that the power source is electrically connected to the electromechanical drive in the gearing housing.

BRIEF DESCRIPTION OF THE DRAWINGS

FIG. 6b shows a perspective outside view of the functional subassembly from FIG. 6a;

FIG. 6c shows an inside view of the functional subassembly from FIG. 6a;

FIG. 6d shows a perspective inside view of the functional subassembly from FIG. 6a;

FIG. 11b shows a perspective inside view of FIG. 11a.

DETAILED DESCRIPTION OF THE DRAWINGS

Figure 1:
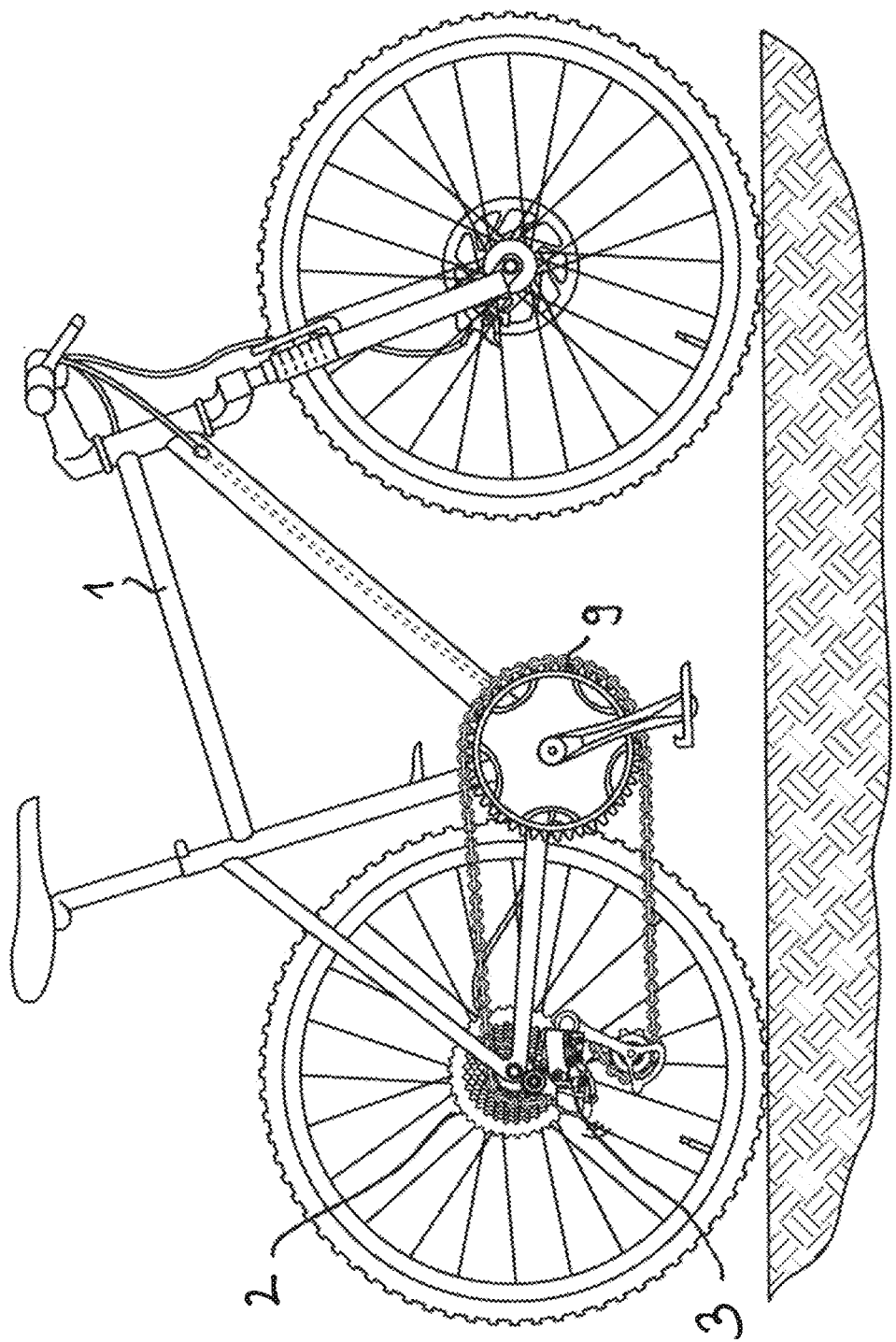
FIG. 1 shows a conventional electric derailleur installed on a bicycle.

An electromechanical derailleur for assembly on a rear wheel axis of a bicycle may have a stationary element, a pivoting mechanism, a movable element having a chain guide arrangement, a gearing housing, and a power source electrically connected to an electromechanical drive in the gearing housing. Due to the configuration of the stationary element, the power source can be fastened directly to the stationary element. The power source in the fastened state is disposed directly beside the gearing housing and is electrically connected to the drive located in said gearing housing.

In particular a fastener is configured between the stationary element and the power source, said fastener permitting the power source to be fastened to the stationary element such that the power source is electrically connected to the electromechanical drive in the gearing housing. The fastener for fastening the power source is attached to the stationary element. No additional receptacle or support for the battery is required for mechanical fastening.

The electromechanical drive comprises a gearing which is coupled to and activated by an electric motor (drive unit). Both the gearing and the electric motor are received in the gearing housing.

The exact construction of the drive parts that are located in the gearing housing can be accomplished by any conventional means. Because the gearing housing is configured to be separable from the stationary element, independent pre-assembly of the electromechanical drive is possible. This modular construction permits a independent or isolated production, pre-assembly, and testing of the individual components of the derailleur. Defective modules, particularly a defective drive unit, can be replaced without other modules being affected. The modular construction allows the stationary element and gearing housing to be made from different materials.

Positioning the gearing housing in the housing void of the stationary element offers further advantages. It permits the housing to be securely fixed relative to the stationary element. The gearing housing is fixed relative to the stationary element so as to be secured against rotation. In particular, the gearing housing is connected in a form-fitting and/or force-fitting manner to the stationary element. The stationary element thus encompasses the housing and protects the housing from external influences, such as shocks. Moreover, this arrangement permits a space-saving construction of the derailleur.

The configuration of the stationary element according to an embodiment permits both the gearing housing and the power source to be fastened to the stationary element. In the fastened state, the gearing housing, or the drive received therein, and the power source are positioned so as to create an electrical connection. Because the drive unit and the power source are positioned adjacent to one another, a direct connection between the power source and the electromechanical drive can be established. No cables are required to bridge any spacing between the drive and the battery.

According to an embodiment, the power source is releasably fastened to the stationary element. The fastener for the power source comprises a fastening opening and a fastening hook. The fastening hook is rotatably mounted, which permits a simple and tool-free removal and fastening of the power source for charging.

According to an embodiment, the stationary element comprises multiple parts. In particular, the stationary element comprises a first base element and a second base element. The first base element is suitable for assembly on a bicycle frame. The second base element is suitable for assembly on the first base element. The housing void is defined by a space in between the first and the second base element, wherein the first base element and the second base element define a first and a second part of the housing void, respectively. In the assembled state, the space defined between the base elements forms the housing void in which the gearing housing is at least partially disposed.

In order for the first and the second base element to be connected, said first and said second base elements are screwed together in the joining direction. To accomplish this, the first and the second base elements have a plurality of first and second joining points, respectively. The joining points are configured as openings for receiving screws. In an embodiment, three joining points are provided on the first base element and three on the second base element. The base elements in the connected states are mutually fixed.

In an embodiment in which the stationary element comprises multiple parts it is advantageous that the gearing housing can be readily inserted in the void created therebetween. The gearing housing is fixed between the base elements by connecting the first and the second base element. The gearing housing and the base elements are configured such that no additional components are required for the gearing housing to be fixed relative to the stationary element.

According to an embodiment, the fastening hook is disposed on the first base element, and the fastening opening is disposed on the second base element. The power source can be fastened to the stationary element by a snap-fit mechanism. To achieve this, the power source has a fastening counterpart piece that is capable of engaging the fastening hook on the first base element. Moreover, the power source is supported on the stationary element by a fastening protrusion on the power source which engages the fastening opening in the second base element of the stationary element. This protrusion on the power source is initially inserted into the fastening opening of the second base element, positioned, and the fastening hook is subsequently snap-fitted in the fastening counterpart piece of the battery.

In general terms, the fastening permits a releasable connection between the stationary element and the power source. Alternate configurations of the fastening mechanism and/or power source positioning on the stationary element are also available.

According to an embodiment, the power source is attachable to the rear of the stationary element. The power source is thus also disposed to the rear of the drive unit or the gearing housing. The power source is, however, disposed so as to be directly adjacent to the drive unit. The rearward disposal renders the power source readily accessible and offers sufficient space to avoid colliding with the remaining components of the derailleur.

The power source can be configured as a rechargeable battery or accumulator, for example as a lithium-ion accumulator.

According to an embodiment, the gearing housing is releasably disposed in the stationary element. The stationary element can comprise either a single part or multiple parts. In the case of a single-part embodiment of the stationary element, the gearing housing could be snap-fitted into a housing void from one side, for example. In the case of a multiple-part embodiment of the stationary element, having a first and a second base element, the gearing housing is fixed in the housing void between the two connected base elements. The gearing housing is inserted into the housing void of the first base element and is fixed in the housing void when the second base element is connected to the first base element. The gearing housing is thus fixed in all directions relative to the base elements. The two base elements must be disassembled in order for the gearing housing to be released.

The external contours of the gearing housing are configured to engage with the internal contours of the stationary element. In other words, the external contours of the gearing housing form a complimentary structure to the internal contours of the base elements. In particular, the gearing housing can be inserted into the two-piece base element, or be removed therefrom, only along the joining axis. This embodiment results in a particularly secure fit of the gearing housing in the stationary element. No additional screw-fitting or fastening between the gearing housing and the stationary element is required.

According to an embodiment, the gearing housing has a first and a second housing part. The two housing parts can be connected by means of screws at a plurality of, for example six, housing joining points. A connection of the housing parts along the joining axis which corresponds to the joining direction of the base elements permits especially simple assembly.

In particular, the first housing part is received in the first housing void of the first base element, and the second housing part is received in the second housing void of the second base element.

According to an embodiment, an electrical interface exists between the gearing housing and the power source. In particular, the gearing housing has an electrical interface that connects to the power source, said electrical interface potentially being configured as electrical contacts. The electrical contacts on the gearing housing interact with corresponding counterpart contacts on the power source. By virtue of the directly adjacent disposal of the gearing housing and the power source on the stationary element, no cables are required for the transmission of power. An electric current is transmitted from the power source directly to the drive, specifically, to the electric motor, in the gearing housing.

According to an embodiment, the pivoting mechanism has an external pivoting element and an internal pivoting element. The external pivoting element is rotatably connected to the stationary element by a first pivot pin, and is rotatably connected to the movable element by a third pivot pin. The internal pivoting element is rotatably connected to the stationary element by a second pivot pin, and is rotatably connected to the movable element by a fourth pivot pin.

The internal pivoting element comprises a first and a second pivot arm. The first pivot arm is disposed above the second pivot arm. The first and second pivot arms of the internal pivoting element are each rotatably connected to the stationary element by the second pivot pin, and are each rotatably connected to the movable element by the fourth pivot pin. The pivot arms are separately configured components. The separate pivot arms are each positioned with the aid of the second and the fourth pivot pin. According to an embodiment, a reinforcement pin reinforces the lower and the upper internal pivot arm. Said reinforcement pin runs parallel to the pivot pins of the pivoting mechanism.

According to an embodiment, the four pivot pins define four pivot axes of the pivoting mechanism, said pivot axes being aligned so as to be substantially perpendicular to the assembly axis of the derailleur, or the rear wheel axis, of the bicycle. In other words, the four pivot axes lie in each case in a plane which lies perpendicular to the rear wheel axis or parallel with the planes of the sprockets comprised by the drivetrain of the bicycle.

According to an embodiment, the first base element has a first upper pin receptacle and the second base element has a first lower pin receptacle for receiving the first pivot pin. The first base element furthermore has a second upper pin receptacle and the second base element furthermore has a second lower pin receptacle for receiving the second pivot pin. The pin receptacles of the first and the second base element extend in a plane which runs substantially perpendicular to the assembly axis M of the derailleur or to the rear wheel axis A. The second pivot pin may comprise an upper pin stump and a lower pin stump. The upper pin stump is mounted in the upper second pin receptacle of the first base element and is supported on the gearing housing.

According to an embodiment, the joining axis, or the joining direction, of the gearing housing and of the base elements runs substantially parallel with the pivot axes of the pivot pins. The first and the second pivot axes of pin receptacles in the base elements thus also extend parallel with the joining direction. In other words, both the joining axis as well as the pivot axes run along a plane that is perpendicular to the rear wheel axis. This alignment of the pivot axes permits better absorption of vertical shocks. Moreover, the parallel alignment of the pivot pin axes facilitates the production, the demolding, and the joining process.

According to an embodiment, a drive arm is disposed between the electromechanical drive and the movable element. The drive arm is coupled to the gearing and moves the movable element in response to the operation of the gearing of the electromechanical drive. The gearing comprises an output shaft to which the drive arm is fixedly coupled in a rotational manner. The drive arm may have a detent which pushes against the pivoting mechanism, specifically the lower internal pivot arm. The drive arm pushes the pivoting mechanism in a first direction, typically in an outward manner, and therefore in a shift direction from a larger sprocket to a smaller sprocket. The output shaft rotates in a clockwise direction to execute this action. The output shaft runs so as to be coaxial with the second pivot axis, or coaxial with the two pin stumps of the second pivot pin. The output shaft is decoupled from the pivot pin.

According to an embodiment, a restoring spring is mounted on or about the fourth pivot pin. A longitudinal axis of the spring runs coaxially with the fourth pivot axis. The spring legs of the restoring spring are tensioned between and bear against the movable element and the drive arm. The restoring spring pretensions the movable element of the derailleur relative to the stationary element. The drive arm is pretensioned in a second direction, in an inward manner in the shift direction from a smaller sprocket to a larger sprocket. In other words, the pivoting mechanism is pushed inwards. When shifting in an outboard direction to a smaller sprocket the electric drive has to move the pivoting mechanism counter to the spring force. When shifting in an inboard direction to a larger sprocket the pretensioning of the restoring spring assists the electric drive. The drive arm pushes in an inward manner against the spring and the inwardly pretensioned pivoting mechanism follows.

Alternatively, the spring could also pretension the derailleur in an outward manner. To achieve this, the spring would have to be wound in the opposite direction. Accordingly, the drive arm in this instance would push from the outside in an inward direction against the pivot arm, and the spring would bear externally on the drive arm. This would have the advantage that the spring supports the motor when shifting in an outboard direction from a large to a smaller sprocket. A particularly large force has to be applied to shift in this direction. With this arrangement, shocks from the outside could also be cushioned. This embodiment is not shown.

A further aspect of the invention relates to the assembly of the derailleur. Rear derailleurs are usually fastened on the right dropout end of the frame with the aid of a derailleur hanger. At one end, the derailleur hanger is fixed to the frame so as to be coaxial with the rear wheel axis A, and at the other end the hanger is connected to the stationary element along the assembly axis M. Thus, the rear wheel axis A and the assembly axis M are spaced apart from each other. This corresponds to the embodiments also shown in FIGS. 1 and 2. According to an embodiment not shown here, the electromechanical derailleur may also be coaxially mounted on a rear wheel axis. This means that the assembly axis M of the derailleur corresponds to the rear wheel axis A. The first base element for fastening to the bicycle frame could have an internal assembly arm and an external assembly arm. The assembly arms are spaced apart from one another in the axial direction. In the assembled state, the first assembly arm is located on an interior side of the frame and the second arm is located on an exterior side of the frame. Each of the arms has a receptacle for the B bolt. The first base element is fastened to the bicycle frame with the aid of the B bolt, which penetrates both arms and the bicycle frame. The second base element and the remaining parts of the derailleur follow the same principles as preceding embodiments. An assembly of the derailleur that is coaxial with the rear wheel axis A has the advantage that no unstable derailleur hangers which are susceptible to damage are required. A more precise assembly which is less tolerance-dependent is also possible. This embodiment is not shown The following embodiments will be described with reference to the drawings. The drawings and descriptions are provided only for visualization and are not intended to be limiting. To provide clarity, the figures show various functional sub-groups or assembly stages of the derailleur embodiments in different scales.

Figure 2:
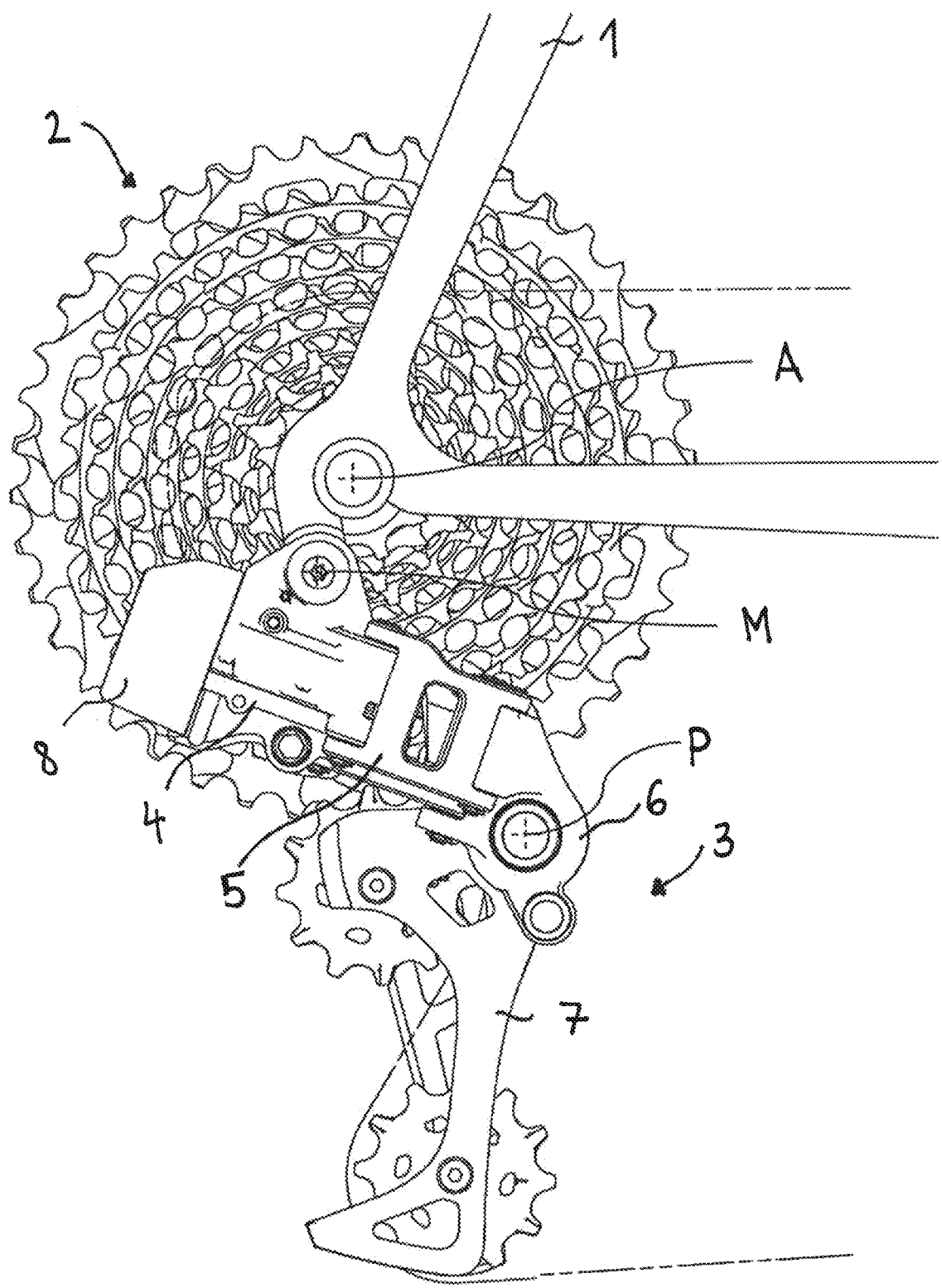
FIG. 2 shows an enlarged side view of a conventional electric derailleur.

FIGS. 1 and 2 show electromechanical rear derailleurs 3 known from the prior art, which are mounted on a rear wheel axis A. The bicycle drive shown in FIG. 1 comprises a front single chain wheel 9, a rear sprocket cassette 2, and a chain, which with the aid of the rear derailleur 3 can be moved from one sprocket to the next. Drives having only one front chain wheel do not require any front derailleur and are preferably combined with an increased number of 11, 12, or 13 rear sprockets. Sprocket cassettes of such drives have a large total gear range of 500% or more. Such gear ranges can be achieved using a smallest sprocket with 9, 10, or 11 teeth, and a largest sprocket having 50 teeth or more. Of course, the derailleur can also be combined with a drive having a plurality of front chainrings and a front derailleur.

The directional indications "front" and "rear", "external" and "internal", "top" and "bottom", "left" and "right" used hereinafter relate to a bicycle which is aligned and used in the travel direction in a standard manner. The bicycle frame 1 has a left and a right rear dropout end between which the rear wheel is mounted. The rear wheel and sprocket cassette 2 rotate about the rear wheel axis A. The largest sprocket of the sprocket cassette 2 is disposed so as to be further inboard than the smaller sprockets. When shifting from a larger sprocket to a smaller sprocket, the rear derailleur 3 moves the chain in an outboard direction. When switching from a smaller sprocket to a larger sprocket, the rear derailleur 3 moves the chain in an inboard direction. The derailleur 3 shown in FIGS. 1 and 2 is fastened along the assembly axis M on the frame 1 and the rear wheel axis A in a conventional manner by way of a derailleur hanger. The spacing between the assembly axis M and the rear wheel axis A is bridged by the derailleur hanger.

The electromechanical derailleur 3 in FIG. 2 comprises a stationary element 4 that can be attached to a bicycle frame 1 and a movable element 6. The chain guide arrangement 7 by way of an upper and a lower chain guide roller is connected to the movable element 6 so as to be rotatable about a rotation axis P. A pivoting mechanism 5, having an external and an internal pivoting element, is pivotably connected to the stationary element 4 and the movable element 6, and enables the repositioning of the movable element 6 and chain guide arrangement 7 relative to the stationary element 4. Both the gearing as well as the electric motor of the electromechanical drive of the derailleur 3 are integrated in the stationary element 4. A battery 8 is releasably disposed on the rear side of stationary element 4.

The pivoting mechanism 5 may be a straight parallelogram-type (FIG. 2) linkage mechanism or of the slanted parallelogram-type (FIG. 1). The straight-type pivoting mechanism 5 shown in FIG. 2 has a linkage mechanism with pivot pins or pivot axes which lie substantially perpendicular (that is, within a few degrees) to the axis direction of the rear wheel axis A. The pivot axes are also substantially parallel with the planes defined by the sprockets. This allows the movable arrangement 6 and 7 to move substantially horizontally when shifting. When a bicycle travels across rough terrain, forces act in the vertical direction on the moveable element 6 of the derailleur 3. For a slanted linkage mechanism as shown in FIG. 1, the axes of the pivot pins are slanted relative to the sprocket planes. Forces acting in the vertical direction can be transmitted to the gearing by the linkage mechanism, since the linkage mechanism can move in a substantially vertical direction. By contrast, the straight pivoting mechanism 5 moves in a substantially horizontal direction due to the vertical alignment of the pivot pins and pivot axes. The elements of the derailleur are thus isolated from the vertical forces generated when the bicycle travels over rough terrain. Vertical shocks are not transmitted to the gearing.

Figure 3:
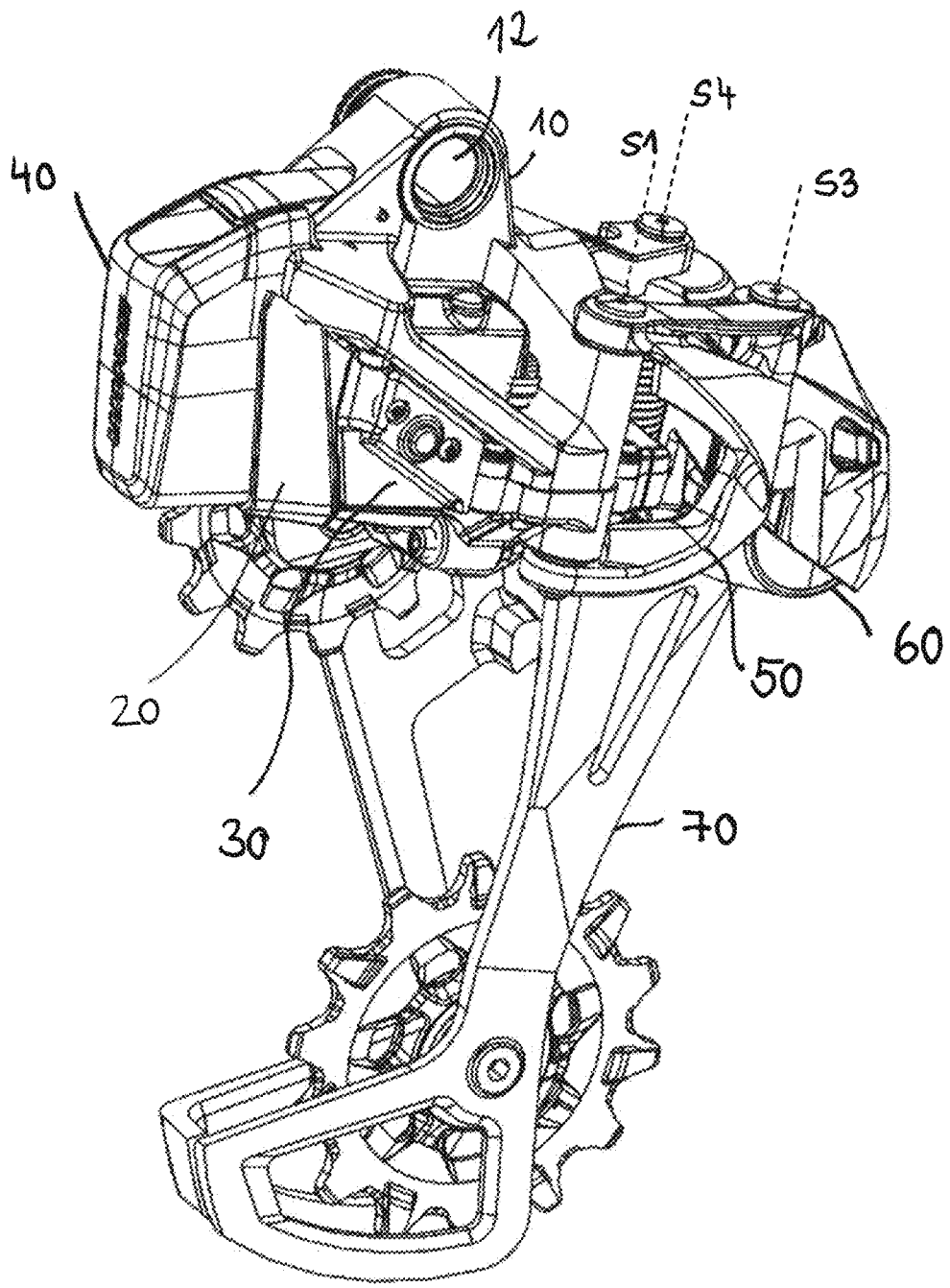
FIG. 3 shows a perspective view of the electric derailleur.

FIG. 3 shows an oblique perspective view of the electric derailleur from the rear. The derailleur is composed of a stationary element, a movable element 60 having a chain guide arrangement 70, and a pivoting mechanism 50. The stationary element comprises a first base element 10 and a second base element 20. The first base element 10 is mounted on a bicycle frame by the receptacle for B bolt 12 and of a bolt (B bolt) not shown here. The second base element 20 is mounted on the first base element 10. The pivoting mechanism 50 is configured as a quadruple-jointed straight parallelogram having an inner and an outer pivoting element and four pivot axes S1, S2, S3, S4. The four pivot axes S1, S2, S3, S4 run along planes perpendicular to the rear wheel axis A. Thus, the pivot axes S1, S2, S3, S4 lie along planes parallel with the sprocket planes (see FIGS. 1 and 2). The first and the second pivot axis S1, S2 (obscured in FIG. 3) connects the pivoting mechanism 50 to the first and second base elements 10, 20. The third and the fourth pivot axis S3, S4 connects the pivoting mechanism 50 to the movable element 60.

The first and the second base element 10, 20 together form the stationary element 4 which defines a housing void. The gearing housing 30 is received in the housing void between the first and second base elements 10, 20 and is fixed relative to the stationary element. The stationary element is configured such that a battery 40 can be fastened thereto so as to be in direct contact with the gearing housing 30. The battery 40 is disposed on the rear side of the stationary element. The second base element 20 encompasses the battery 40 on at least two sides. The gearing housing 30 is disposed directly adjacent to the battery 40 and at least partially in the housing void of the stationary element.

The gearing housing 30 protrudes from the stationary element towards the front in the direction of the pivoting mechanism 50 and extends into the region of the pivoting mechanism 50. More specifically, the inner and outer pivoting element of the pivoting mechanism 50 form a further void between them into which the gearbox 30 can extend. The further void is bounded at the top and bottom by the respective upper and lower pivot arms of the pivoting elements. Recesses in the pivoting elements allow pivoting mechanism 50 to pivot relative to the stationary gearing housing 30 without them colliding (this will be expounded further in the context of FIG. 5a). This embodiment saves space and allows for disposal of a relatively large gearing housing 30 which may protrude beyond the housing void defined by the first and second base elements 10, 20, without needing to enlarge the dimensions of the other derailleur parts.

The chain guide arrangement 70 is connected to the movable element 60 so as to be rotatable about the axis P and is pretensioned in the clockwise direction (to the rear) to tension a chain (not shown here) that runs through the chain guide 70 in an S-shaped manner. The chain guide arrangement 70 comprises an upper and a lower chain guide roller which are mounted rotatably between two chain guide cage halves. The upper chain guide roller is rotatably disposed at an upper distance from the P axis about the upper rotation axis. The lower chain guide roller is rotatably disposed at a lower distance from the P axis about the lower rotation axis, wherein the upper chain guide roller is disposed at a shorter distance from the P axis than the lower chain guide roller.

Figure 4:
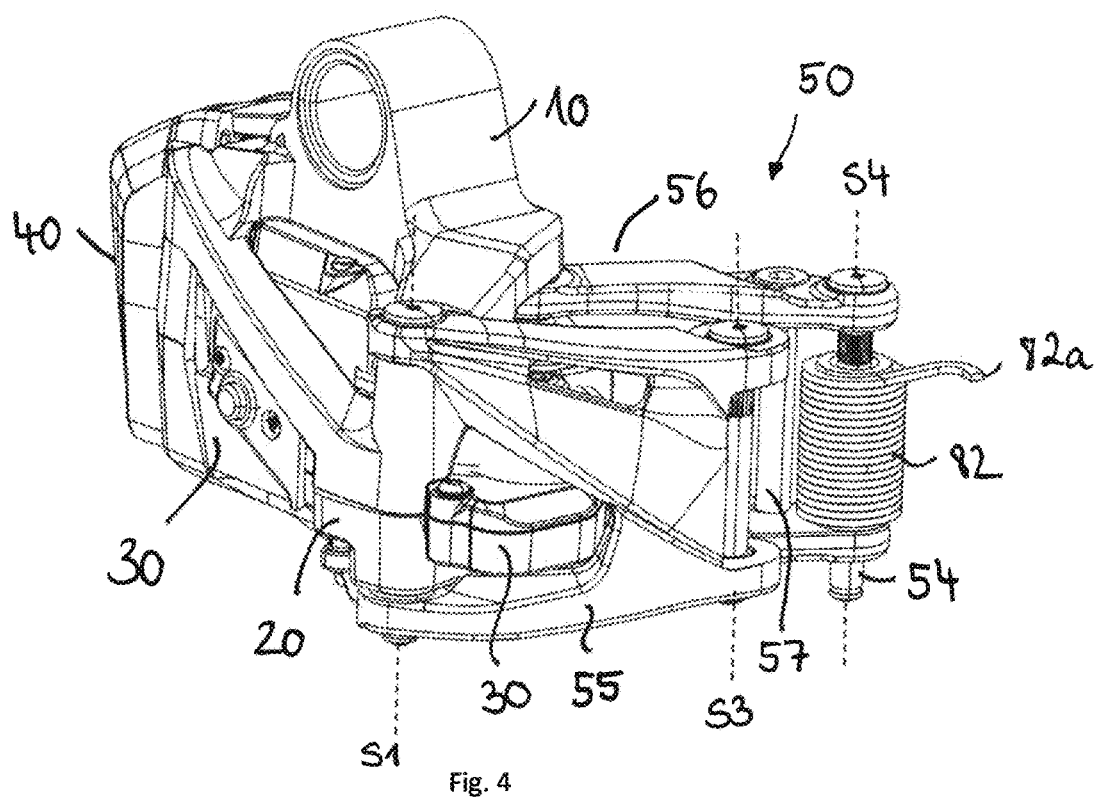
FIG. 4 shows a perspective outside view of a functional subassembly of the derailleur.
Figure 5:
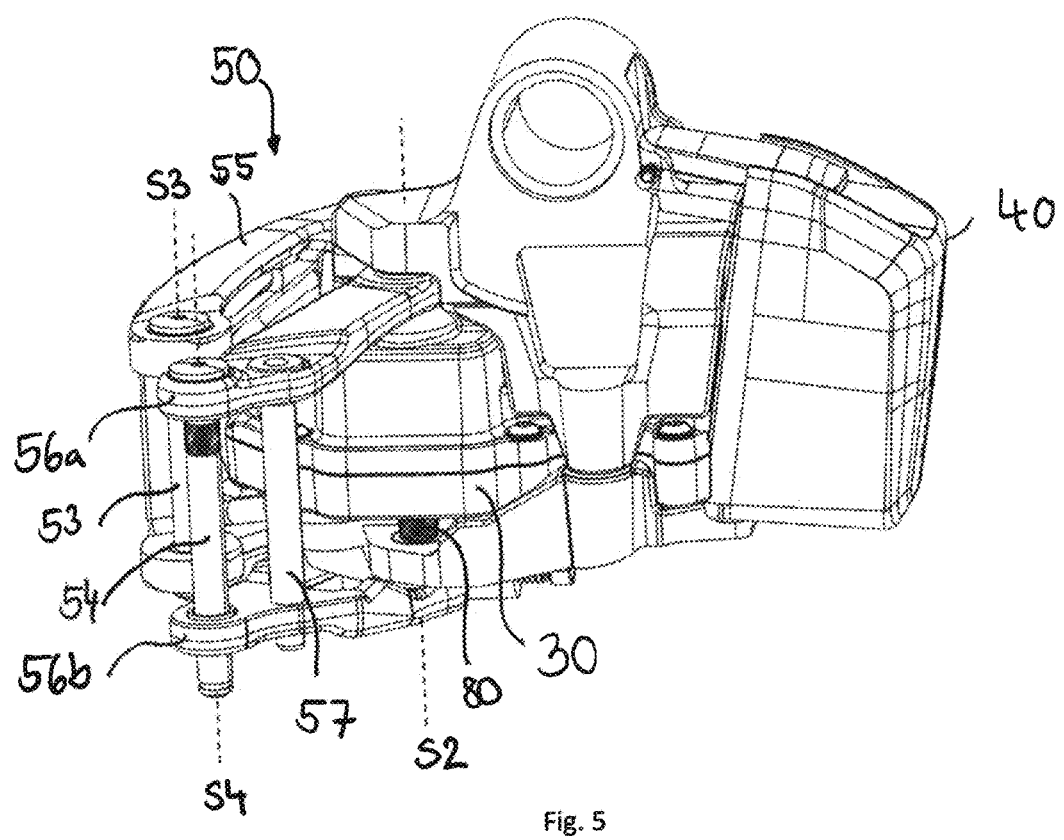
FIG. 5 shows a perspective inside view of a functional subassembly of the derailleur.
Figures 5A, 5B:
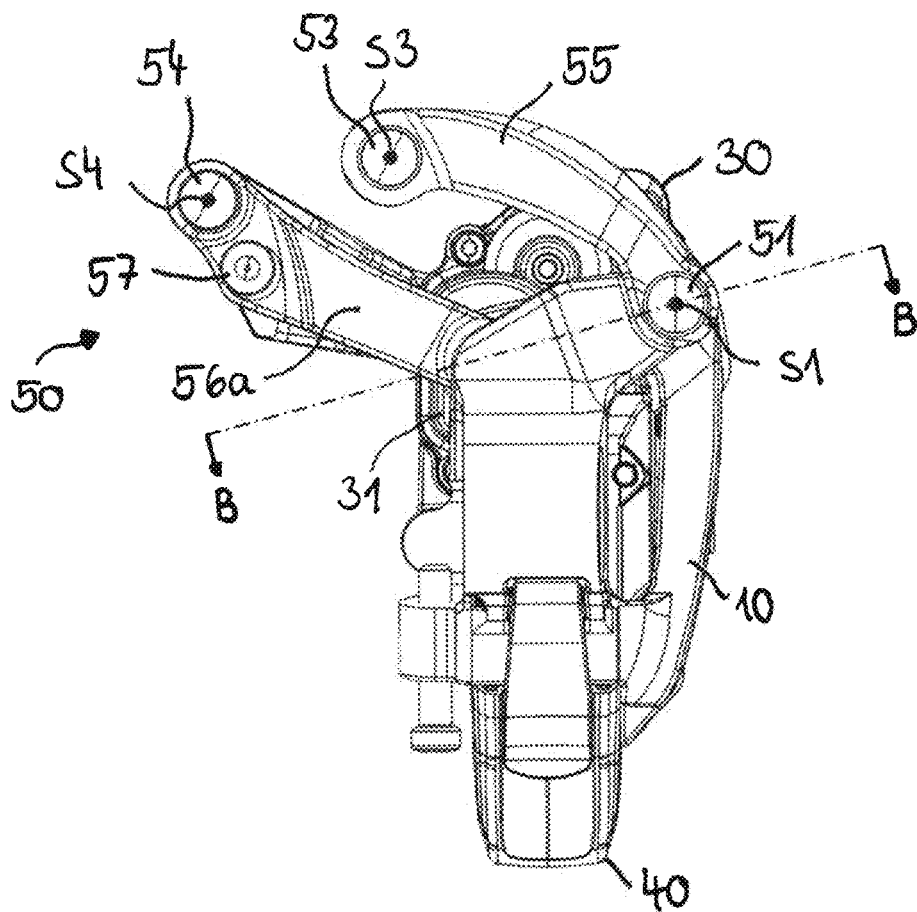
FIG. 5a shows a plan view of FIG. 5.
FIG. 5b shows a section B-B along the pivot axes 51 and S2.

FIGS. 4 through 5*b* show a functional subassembly of the derailleur in which the pivoting mechanism 50 is pivoted far in the inboard direction. For clarity, the moveable element and the chain guide arrangement are not shown here. Comparing FIGS. 4 through 5*b* clearly illustrates the pivoting function of the derailleur.

The shown position of the pivoting mechanism 50 corresponds to a shift position on the largest and innermost sprocket. The gearing housing 30 extends beyond the housing void of the first and the second base element 10, 20 towards the front into a further void formed by the pivoting mechanism 50. The further void of the pivoting mechanism 50 is bounded on the outside by the outer pivoting element 55 and on the inside by the inner pivoting element 56.

The limited lateral movement can be avoided by recesses in the pivoting elements 55, 56. The further void of the pivoting mechanism 50 is bounded on the top by the upper arms and on the bottom by the lower arms of the inner and outer pivoting element 55, 56. The gearing housing 30 and the pivoting mechanism 50 are configured so as to avoid colliding with one another even in the extreme positions of the pivoting mechanism 50. The pivoting elements 55, 56 rotate above and below the gearing housing 30, respectively, or have recesses which can be penetrated by the gearing housing 30.

In known constructions, the derailleur is usually pretensioned in one direction by a tension spring that extends diagonally through the pivoting mechanism. Such a conventional tension spring is tensioned, for example, from the outer pivot pin on the stationary element to the inner pivot pin of the moveable element, thus occupying the space interior of the pivoting mechanism.

By contrast, the derailleur shown in FIG. 4 comprises a restoring spring 82 in the form of a torsion spring which is mounted on the fourth pivot pin 54. The restoring spring 82 is configured as a leg spring or a torsion spring with the spring leg 82*a* being tensioned between the moveable element and the drive arm 81. A first end 82*a* of the restoring spring 82 is supported on the moveable element, and a second end of the restoring spring 82 (not visible here) is supported by a groove 81*b* on the drive arm 81 (see FIGS. 6*a* through 6*d*). The spring legs of the spring 82 each push from the inside towards the outside against the drive arm 81 and the moveable element 60. As a result, the derailleur is pretensioned by the restoring spring 82 in an inward manner. This means that the pivoting mechanism 50 is pushed inwards relative to the first and second base elements 10, 20. This arrangement of the spring 82 does not extend into the further void defined by the pivoting mechanism 50.

In order to move the pivoting mechanism 50 in an outboard direction, that is to say from a larger to a smaller sprocket, the electromechanical drive rotates the output shaft 80 and the drive arm 81 in the clockwise direction about the pivot axis S2 (as viewed from above in FIG. 5*a*). The drive arm 81 includes a detent 81*a* which pushes against a counter detent on the internal lower pivot arm 56*b*, thus moving the inner pivoting element 56 in an outboard direction. To achieve this, the spring tension of restoring spring 82 must be overcome by the motor.

In order for the pivoting mechanism 50 to be moved in an inboard direction, that is to say from a smaller to a larger sprocket, the electromechanical drive rotates the output shaft 80 and the drive arm 81 counterclockwise about pivot axis S2. As a result, the drive arm 81 relaxes the inwardly pretensioned pivoting mechanism 50. Due to the pretensioning of the spring, the pivoting mechanism 50 follows the movement of the drive arm 81 and pivots in an inward direction. The inward bias of the pretensioned restoring spring 82 assists the motor in executing the rotation.

Clockwise rotation of the drive arm 81 in the outboard direction directly moves pivoting mechanism 50 in an outboard direction. Counterclockwise rotation of the drive arm 81 in an inboard direction indirectly moves the pivoting mechanism 50 due to the pretensioning of the restoring spring 82.

Due to the arrangement of the drive arm 81 and the spring 82, forces that act against the derailleur from the inside are not transmitted to the gearing. A shock from the inside would indeed pivot the movable arrangement 50, 60, 70 in an outward manner, but would not have any effect on the drive arm 81, and thus also not on the gearing.

This arrangement of the spring 82 also represents a protective mechanism for the derailleur because the restoring spring 82 can act as a force accumulator spring. When shifting from a small to a large sprocket (inboard), the pivoting mechanism 50 is pivoted in the inboard direction. If shifting in the absence of pedaling, the pivoting mechanism 50 moves the chain guide arrangement 70 inwardly towards the sprockets, however, the chain guide arrangement 70 does not pivot about the P axis towards the front because of the chain tension remaining the same. Consequently, the chain guide arrangement 70, in particular the upper chain guide roller, and the sprockets collide. This problem arises in mechanical as well as electromechanical derailleurs. However, because the forces are greater, greater damage can occur when using electromechanical derailleurs. In the event of a collision, the sprocket cassette acts as an external barrier for the movable arrangement 50, 60, 70. The pivoting mechanism 50 cannot be pivoted inwardly any further. The pivot arm 81, however, can push further from the output shaft 80, in a counterclockwise direction, against the second spring leg. Because of this, the spring 82 is further tensioned and acts as a force accumulator. As soon as the cyclist starts to pedal, the chain guide arrangement 70 pivots about the P axis towards the front and releases the pivoting mechanism 50. The force that is stored in the spring 82 is released and pivots the pivoting mechanism 50 further inboard. The shifting procedure is completed in a delayed manner, so to speak. Similarly, the pivoting of the pivoting mechanism 50 could be blocked by an external force. In this case, when the external force is removed, the force accumulating function of the spring 82 will also result in delayed pivoting. The restoring spring 82 thus serves three functions. The restoring spring 82 pretensions the derailleur in one direction (inboard), thus removing any mechanical play of the gearing and the pivoting mechanism. The spring 82 furthermore protects the gearing from external forces which act on the derailleur from the inside outwards. If the pivoting mechanism is blocked in the inboard direction, the force accumulating effect of the spring delays the execution of the shifting procedure.

FIG. 5 shows a perspective internal view of the derailleur. In this view, the restoring spring 82 (typically mounted about S4) and the drive arm 81 (typically mounted about S2) are omitted. This allows the output shaft 80, which is aligned coaxially with the pivot axis S2, to be visible. The internal pivoting element 56 is composed of an upper and lower pivot arm 56a, 56b, respectively, which are rotatably mounted on the second pivot pin 52. The two arms 56a, 56b of the internal pivoting element 56 are both reinforced by a reinforcement pin 57. The reinforcement pin 57 extends between the two arms 56a, 56b parallel with the pivot axes and is connected in a force-fitting and form-fitting manner to the arms 56a, 56b, for example screw-fitted in one arm and riveted to the other arm (illustrated in a non-riveted state at the bottom of FIG. 5). The unilateral riveting prevents the two arms 56a, 56b from rotating independently when assembling the reinforcement pin 57. In other words, the openings for the reinforcement pin 57 remain coaxially aligned during assembly. The reinforcement pin 57 prevents any misaligned movement between the upper and the lower pivot arm 56a, 56b. The reinforcement pin 57 is inserted and connected to the arms after the assembly and alignment of the second and the fourth pivot pins 52, 54 with the first and second base elements 10, 20 and the movable element 60. This reinforcement of the two-part internal pivot element 56 by means of a separate reinforcement pin 57 is an independent feature which may be used on its own, apart from any other features disclosed herein.

The configuration having an upper and a lower pivot arm 56a, 56b permits the assembly of the multi-part second pivot pin 52. The two pin stumps 52a, 52b can only be assembled in embodiments having an upper and a lower pivot arm. Moreover, this facilitates the assembly and the tensioning of the restoring spring 82. The spring 82 is tightly wound, therefore applying a uniformly high pretensioning to the pivoting mechanism 50 across the entire pivoting range.

As can be derived from the top view in FIG. 5a, a front part of the gearing housing 30 penetrates the external pivoting element 55 when it is pivoted far to the inside. For this to occur, the external pivoting element 55 has a recess between the upper and lower pivot arms. This view also shows how far the gearbox 30 protrudes towards the front beyond a plane (corresponding to the line B-B) formed by the first and the second pivot axis S1, S2. Approximately two thirds of the gearing housing 30 is received in the housing void of the stationary element. Approximately one third of the gearing housing 30 protrudes beyond the housing void of the stationary element and is received by the further void defined by the pivoting mechanism 50.

The size of the gearing housing 30 is bounded in a number of ways. To the front, the housing size is bounded by the pivoting mechanism 50, and to the rear by the area where the battery 40 connects. On the outside, the housing size is bounded by the first pivot pin 51. The first pivot pin 51 is laterally guided past the outside of the gearing housing 30 and is mounted in the first and second base elements 10, 20. On the inside, the housing size is bounded by the pivot plane of the chain guide arrangement 70. In the outermost shift position, on the smallest sprocket, the pivoting mechanism 50 is pivoted in a fully outward manner, and the chain guide arrangement 70 is pivoted about the P axis to the rear so as to tension the chain. In this position, the chain guide arrangement 70, specifically the upper chain guide roller, must be able to be guided laterally past the gearing housing 30 without colliding with the inside of the gearing housing 30. The gearing housing 30 can indeed project in an inboard direction beyond the first and second base elements 10, 20, but only up to the plane to which the chain guide arrangement 70 is pivoted.

FIG. 5b shows a sectional view along the line B-B plotted in FIG. 5a. The sectional plane also corresponds to the imaginary plane described above through the pivot axes 51 and S2. The gearing housing 30 located in the housing void of the first and second base elements 10, 20 has an upper housing part 31 and a lower housing part 32. Within the gearing housing 30, the figure only shows the output shaft 80, which is rotatably mounted between the upper and the lower housing part 31, 32 and exits through an opening in the lower housing part 32. Outside the housing 30, the output shaft 80 is coupled in a rotationally fixed manner to the drive arm 81. The remaining parts of the electromechanical drive arranged inside the housing 30, such as the motor or gear wheels, are not illustrated. The upper arm of the external pivoting element 55 surrounds the first pivot pin 51 above the first base element 10, and the lower arm of the external pivoting element 55 surrounds the first pivot pin 51 below the second base element 20.

The two-part second pivot pin 52 is composed of an upper pin stump 52a and a lower pin stump 52b. The upper pin stump 52a is mounted in a rotationally fixed manner between the first base element 10 and the upper housing part 31. The upper pin stump 52a is press-fitted into the second base element 20 and is supported on the upper housing part 31. To achieve this, the upper housing part 31 has a pin stump receptacle 36. The upper internal pivot arm 56a rotatably surrounds the upper pin stump 52a. The lower pin stump 52b is also press-fit mounted in a rotationally fixed manner to the second base element 20. The lower internal pivot arm 56b rotatably surrounds the lower pin stump 52b. The upper arm of the internal pivoting element 56a below the first base element 10, and the lower arm of the internal pivoting element 56b below the second base element 20, are thus rotatably connected to the second pivot pin 52. The lower end of the output shaft 80 is supported on the lower pin stump 52b. The output shaft 80 is rotatably surrounded by a sleeve-shaped end of the lower pin stump 52b. The output shaft 80, the two pin stumps 52a, 52b, and the second pivot axis S2 are arranged coaxially. The pin stumps 52a, 52b, and the output shaft 80 that is mounted to the lower pin stump 52b, help position the gearing housing 30 in the housing void of the first and second base elements 10, 20.

The internal pivoting element 56, along with the drive arm 81, rotates about the second pivot axis S2. The rotatably mounted internal pivoting element 56 is functionally separate from the transmission of torque from the output shaft 80 to the drive arm 81. The internal pivoting element 56 is rotatably mounted to the upper and the lower pin stump 52a, 52b. The two pin stumps 52a, 52b are each connected in a rotationally fixed manner to the first and the second base element 10, 20. The internal pivoting element 56, comprising the upper and lower arms 56a and 56b, respectively, thus rotate about the stationary pin stumps 52a, 52b. The pin stumps 52a, 52b are coaxially disposed with the output shaft 80, but are functionally separated from it. The output shaft 80 rotates relative to the second pivot pin 52, and the two pin stumps 52a, 52b. The output shaft 80 is rotatably mounted to the lower pin stump 52b. The transmission of torque from the output shaft 80 to the drive arm 81 is independent of the rotatable mounting. The torque of the output shaft 80 is transmitted to the lower pivot arm 56b, and thus indirectly to the pivoting mechanism 50 via the drive arm 81.

Electromechanical derailleurs known from the prior art usually have gearing output shafts which extend through the entire gearing housing and exit the housing at two locations. The two exiting ends of the gearing output shaft usually also serve as bearings for the pivot arms of the pivoting mechanism. Impacts that arise when cycling, or other external forces that act on the derailleur, are transmitted from the pivoting mechanism, more specifically from the pivot arms that are mounted on the gearing output shaft, by the gearing output shaft to the gearing and can damage the gearing. By contrast, the output shaft 80 according to the embodiment described above, which is decoupled from the pivoting mechanism 50, has the advantage that forces that act on the derailleur from the outside are transmitted from the pivoting mechanism 50 to the two-part pivot pin 52, but not to the output shaft 80 of the gearing because the output shaft 80 is decoupled from the pivoting mechanism 50. The transmission of torque from the output shaft 80 to the pivoting mechanism 50 is performed indirectly via drive arm 81. A further advantage is that the output shaft 80 exits the gearing housing 30 at only one location. Thus, the gearing housing 30 need only have one opening. A downward-facing opening in the gearing housing 30, as herein described, is less susceptible to the ingress of dirt and water.

In order for the stationary element and pivoting mechanism to move relative to one another, the pivot pins may either a) be connected in a rotationally fixed manner to the stationary element and the pivot elements rotatably mounted to the pivot pins, or b) be connected in a rotationally fixed manner to the pivoting elements and be rotatably mounted on the stationary element.

FIGS. 6a to 6d show various views of a further reduced functional subassembly of an embodiment of the derailleur. A substantial portion of the pivoting mechanism is omitted from these figures. In the absence of the pivoting elements, the drive arm 81 that is rotatably mounted about the second pivot axis S2, having the detent 81a for the pivoting mechanism 50 and the groove 81b for the restoring spring 82, becomes visible. The second pivot pin 52, comprising the upper and lower pin stumps 52a, 52b, respectively, can also readily be seen. The upper pin stump 52a extends along the pivot axis S2 between the pin stump receptacle 36 on an upper side of the upper housing part 31 and the lower side of the first base element 10. The lower pivot pin stump 52b is press-fitted into the second base element 20 and also extends out of said base element 20 in a downward manner along the second pivot axis S2.

Figure 6A:
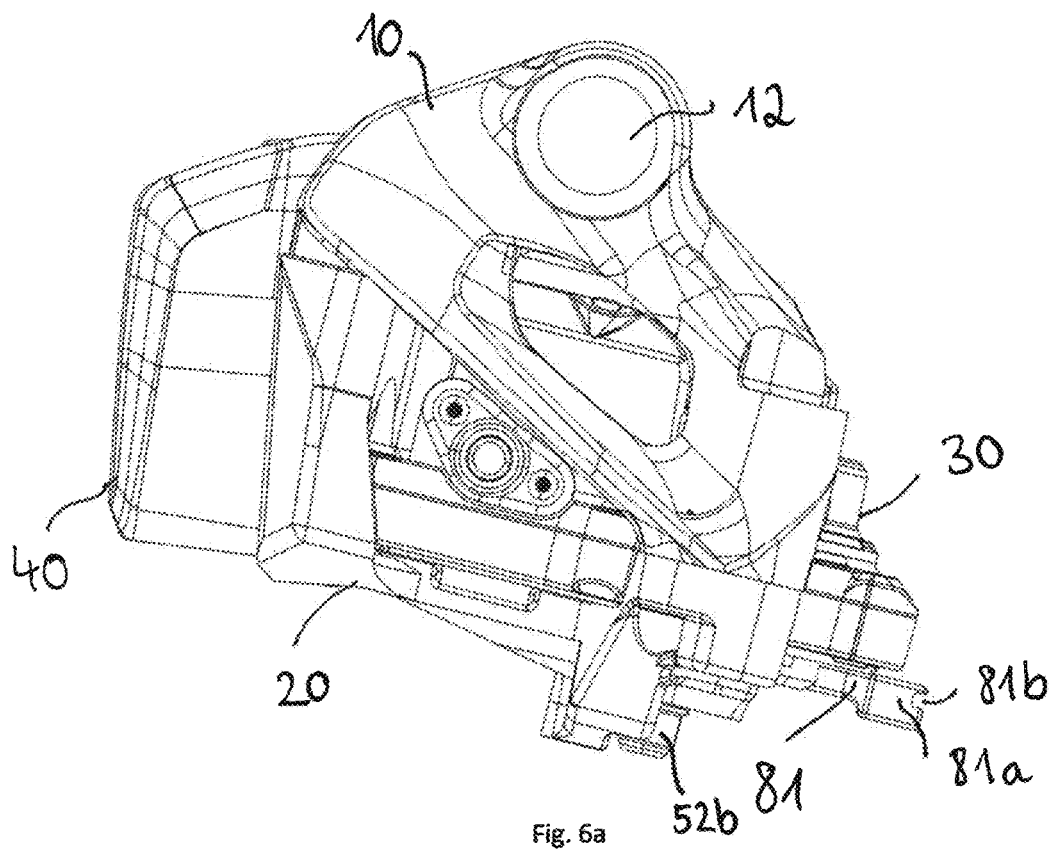
FIG. 6a shows an outside view of a functional subassembly of the derailleur.

FIG. 6a shows an outer side view of the stationary element, comprising the first base element 10, having the B-bolt receptacle 12, and the second base element 20. At one end, the stationary element mounts to the gearbox 30 and to the battery 40 at the other end. The gearing housing 30 is largely disposed in a housing void formed between the first and the second base element 10, 20. The gearing housing 30 extends to the front far beyond said housing void of the stationary element. The battery 40 is disposed to the rear of the gearing housing 30, and of the stationary element, so as to be directly adjacent to the gearing housing 30.

Figure 6B:
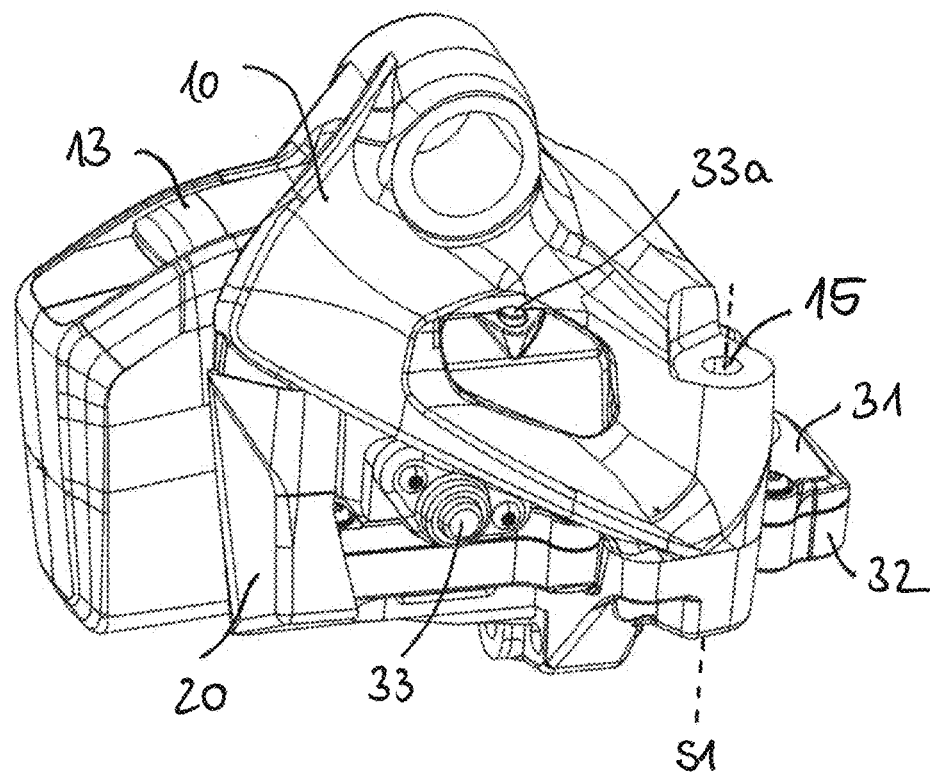

A push button 33, disposed on the gearing housing 30, for manually operating the derailleur and a display in the form of an LED light 33a can be seen in the perspective outside view in FIG. 6b. The LED display 33a may indicate the charge level of the battery or defects. The push button 33 is configured as a diaphragm button to better seal the gearing housing 30. To achieve this, a diaphragm is disposed between the push button 33 and the electromechanical drive inside the housing 30. Alternatively, an adhesive film could also be applied as a seal. In the normal operation of the electromechanical derailleur, shift signals are transmitted wirelessly as radio signals from a switch attached to the bicycle handlebar to a controller of the rear derailleur. The controller and the antenna for receiving the radio signals are disposed inside the gearing housing. Manual operation of the controller directly on the gearing housing does not correspond to the normal operation.

The first and second base elements 10, 20 are configured in a cage-type manner and surrounds the gearing housing 30 so as to securely fix it relative to the stationary element and protect it against external shocks. The first and second base elements 10, 20 also have a plurality of recesses which render the gearing housing 30 and the functional parts 33, 33a, 37 accessible and visible. For example, the rear side of the base element is largely open in order for the electrical interface 37 between the battery 40 and the housing 30 to be accessible (see FIGS. 7, 8, 11b). The cage-type structure and the recesses of the base element are clearly shown in FIGS. 11a and 11b.

FIG. 6b shows the first upper pin receptacle 15 in the first base element 10. The first upper pin receptacle 15, abuts and is functionally extended by a first lower pin receptacle 25 (not visible in FIG. 6b) in the second base element 20. The first pin receptacle 15, 25 extends through the first and the second base element 10, 20 coaxially with the first pivot axis S1, and is suitable for receiving the first pivot pin 51 of the pivoting mechanism 50.

Figure 6C:
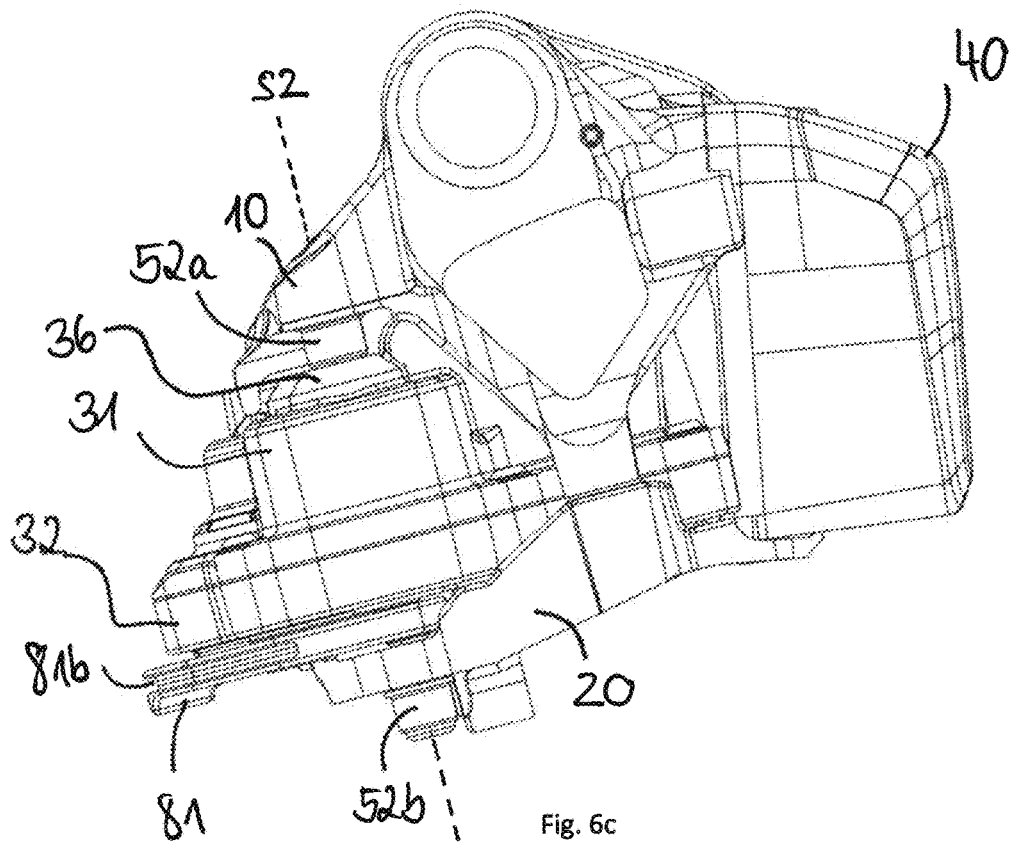
Figure 6D:
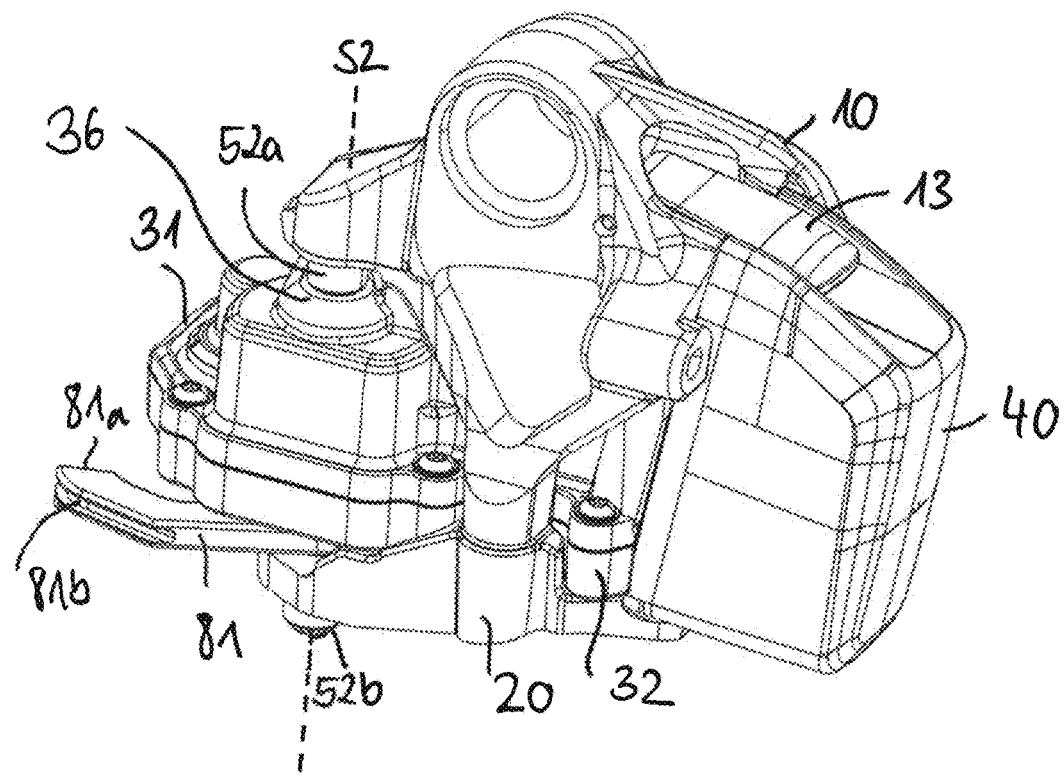

FIGS. 6c and 6d show the respective inside views of the functional subassembly from FIGS. 6a and 6b. The second pivot axis S2 is visible in FIGS. 6c and 6d. The first and second base elements 10, 20 have upper and lower pin receptacles 16, 26, respectively, in which the second two-part pivot pin 52a, 52b is received. The second pin receptacle 16, 26 extends through the first and the second base element 10, 20 coaxially with the second pivot axis S2, and is suitable for receiving the upper and the lower pin stumps 52a, 52b, respectively, of the pivoting mechanism 50. To provide a sufficient engagement face for the internal upper pivot arm (56a not shown in FIGS. 6c and 6d), the upper pin stump 52a extends from the first base element 10 up to the upper housing half 31 where said upper pin stump 52a is mounted in the pin stump receptacle 36. To provide a sufficient engagement face for the internal lower pivot arm (56b not shown in FIGS. 6c and 6d), the lower pin stump 52b extends from the second base element 20 in a downward manner. In general terms, the stationary element has a first and a second pin receptacle for the respective first and the second pivot pins 51, 52 of the pivoting mechanism 50. The axes of the pin receptacles run coaxially with the first and the second pivot axes S1, S2, respectively, and are thus perpendicular to the rear wheel axis A.

Figure 7:
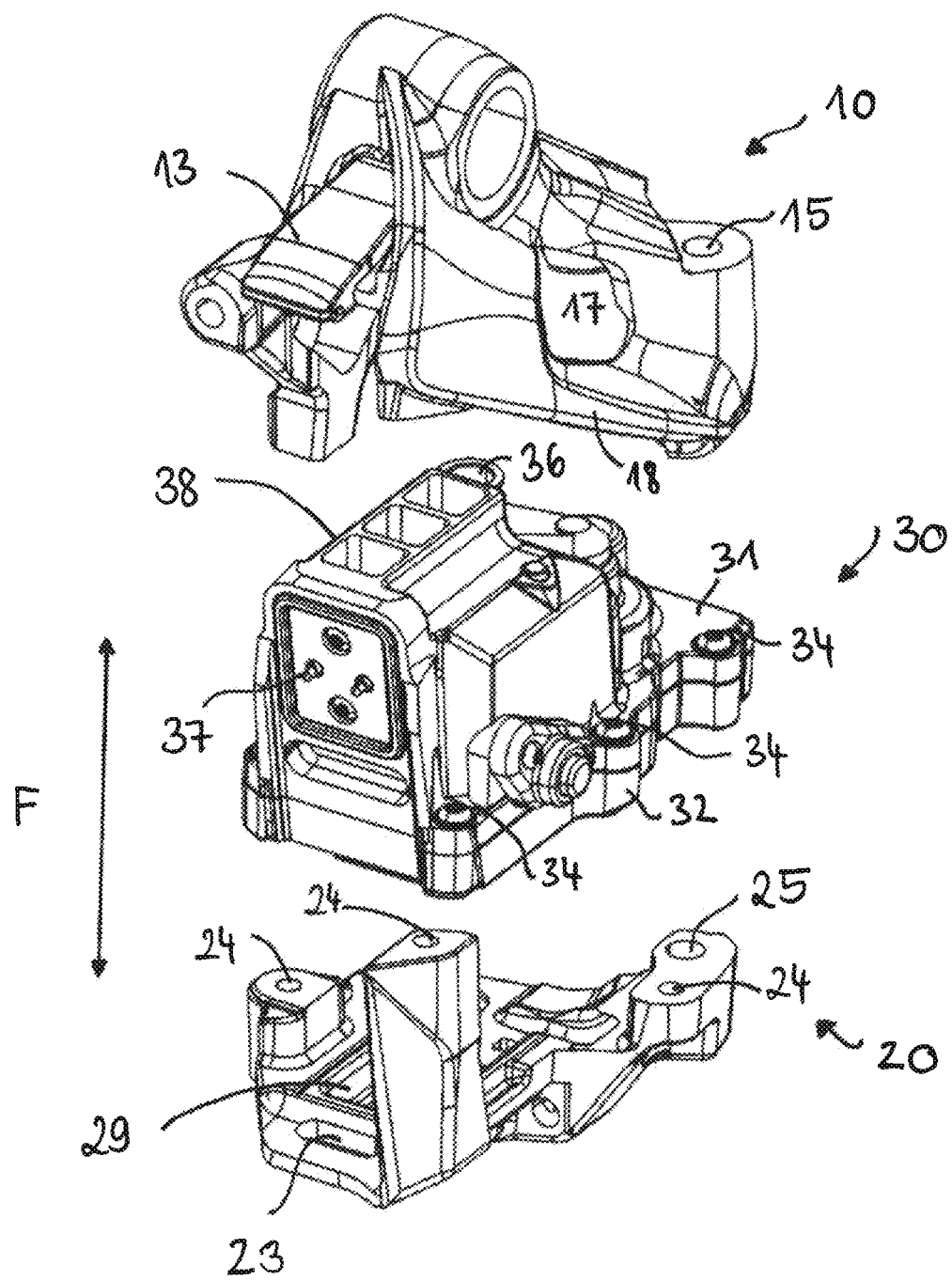
FIG. 7 shows an exploded perspective view of a functional subassembly.

FIG. 7 shows an exploded perspective view of the first and the second base element 10, 20 and of the gearing housing 30. The first and the second base element 10, 20 is assembled along a plurality of first (not visible in FIG. 7) and second joining points 24 using, for example, screws. The gearing housing 30 also comprises an upper part 31 and a lower part 32, which are connected along the housing joining points 34 using, for example, screws. The axes of the joining points of the first and second base elements 10, 20 and of the housing parts 31, 32 run along joining direction F, which is parallel with the first pin receptacles 16, 26 (obscured in FIG. 7) and the second pin receptacles 15, 25 in the first and second base elements 10, 20, respectively. The structural parts that absorb forces, such as the first and second base element 10, 20, can be configured so as to be more solid than the gearing housing 30. The stationary element is made from a metallic material. In one embodiment, these are die-cast aluminum parts. By contrast, the housing parts 31, 32 are light, plastic injection-molded parts, which are simple to produce. The battery 40 is securely anchored to the more stable structural part, the first and second base elements 10, 20. The components of the electromechanical drive can be more readily integrated in a plastic injection-molded part than in a metal housing. The transmission of radio signals to the antenna of the gearing controller that is disposed in the gearing housing 30 is not impeded by the plastic housing 30. A transmitter for transmitting radio signals can be disposed in gearing housing 30. The plastic gearing housing 30 and the recesses 17 in the first and second base elements 10, 20 allow reception and/or transmission of radio signals without interference.

Shapes that taper off are favorable for the demolding of injection-molded or die-cast parts. Both the housing parts 31, 32 and the first and second base elements 10, 20 taper in the direction of their closed sides. That is, the upper parts taper towards the top and the lower parts taper towards the bottom.

The outer contour of the housing 30 is partially determined by the components of the drive that are received in the housing 30. The gear wheels of the gearing are mounted on axles received directly in the first and the second housing part 31, 32.

The outer contour of the gearing housing 30 is also partially adapted to the internal contour of the first and second base elements 10, 20, and fixes the housing 30 relative to the first and second base elements 10, 20. The outer top side of the first housing part 31 is adapted to the inner bottom side of the first base element 10 to enable a form-fitting and/or force-fitting connection between the first housing part 31 and the first base element 10. The outer bottom side of the second housing part 32 is adapted to an inner top side of the second base element 20 to enable a form-fitting and/or force-fitting connection between the second housing part 32 and the second base element 20.

The gearing housing 30 can be inserted into the first and second base element 10, 20, or be removed therefrom, only along the joining direction F. Thus, the upper housing part 31 is inserted into the first housing void 11 of the first base element 10 only in a first joining direction along the joining axis F (towards the top in FIG. 7) and may be removed again in the opposite, second joining direction along the joining axis F (towards the bottom in FIG. 7). Similarly, the lower housing part 32 is inserted into the second housing void 21 of the second base element 20 only in the second joining direction along the joining axis F (towards the bottom in FIG. 7) and may be removed again in the opposite, first joining direction along the joining axis F (towards the top in FIG. 7). The gearing housing parts 31, 32 are held in the first and second base elements 10, 20 in a form-fitting manner in all directions except the joining direction F. When the two base elements 10, 20 are interconnected, it becomes impossible, or only minimally possible, to move the gearing housing 30 along joining direction F. The gearing housing 30 in this instance is enclosed in a form-fitting manner by the base elements 10, 20 and is fixed relative to base elements 10, 20. Importantly, the gearing housing 30 is thus securely fixed against rotation relative to the base elements 10, 20 about the axis of the output shaft 80 (corresponding to the second pivot axis S2).

On the top side of gearing housing 30 is at least one first holding protrusion 38, which engages in a corresponding holding depression in the first base element 10 (form-fitting connection). The holding protrusion 38 and the holding depression taper towards the top. In other words, the lateral faces converge slightly in an oblique manner. A further holding protrusion 39 on the bottom side of the gearing housing 30 (not shown in FIG. 7) engages in a form-fitting manner in a holding clearance 29 of the second base element 20. Said second holding clearance 29 and the holding protrusion 39 may also taper towards the bottom.

The two holding protrusions 38, 39 help to prevent rotation between the gearing housing 30 and the base elements 10, 20. The gearing housing 30 has a tendency to rotate relative to the first and second base element 10, 20 due to the transmission of torque from the output shaft 80 to the pivoting mechanism 50. This rotation is counteracted by the holding protrusions 38, 39. The holding protrusions 38, 39 are disposed as far as possible from the rotation point of the output shaft 80 (second pivot axis S2) to more effectively prevent rotation. The holding protrusions 38, 39 are lengthened so as to absorb as much lateral force as possible. It is particularly important to the precision of shifting the derailleur that the gearing housing 30 is rotationally securely positioned relative to the stationary element.

The gearing housing 30 is made of plastic and allows slight elastic deformation. The gearing housing 30 is slightly larger than the housing void that is formed by the first and the second base element 10, 20, which enables a press-fit between the gearing housing 30 and the first and second base element 10, 20 in the assembled state. The holding protrusion 38 is pressed into the tapered holding depression when the base elements 10, 20 are screwed together. The gearing housing 30, specifically the at least one holding protrusion 38, is slightly deformed in the process, thus resulting in a force-fitting connection between the housing 30 and the first base element 10. Similarly, the second holding protrusion 39 may also be force-fitted into the second holding clearance 29 of the second base element 20.

A form-fitting and force-fitting connection between the gearing housing 30 and the base elements 10, 20 enables a particularly precise positioning and fixing of the gearing housing 30 relative to the other derailleur components.

A further advantage of the at least one holding protrusion 38 is that, decoupled from the rest of gearing housing 30, which receives the electromechanical drive, it can absorb forces without said forces being transmitted to the functional faces of the gearing housing 30. That is, the holding protrusions 38, 39 can be deformed under forces that occur, without affecting the gearing housing 30. This prevents misalignment of the axles of the gearing mounted in the gearing housing 30.

The gearing housing 30 has an electrical interface for a battery 40 that is fastened to the first and second base element 10, 20. The electrical interface on the gearing housing 30 has electrical contacts 37. The fastener for the power source comprises a fastening hook 13, which is rotatably mounted on the first base element 10, and a fastening opening 23 in the second base element 20. The housing 30 is positioned in the first and second base element 10, 20 such that the electrical interface with electrical contacts 37 is oriented close to the fastener 13, 23 for the battery 40.

FIGS. 8 to 11b show a second embodiment of the first and second base element 10, 20, which differs only slightly from the first embodiment shown in FIGS. 3 to 7. Some of the features that differ are the second joining points 24, 24' and the second axle receptacles 25, 25' of the second base element 20. These joining points and axle receptacles have, in the second embodiment, optional protrusions 24', 25', which engage the first base element 10. The protrusions 24′, 25′ shown in FIG. 10 facilitate assembly because said protrusions 24′, 25′ prevent any movement of the base elements 10, 20 relative to one another. The first and second base element 10, 20 are interconnected in a form-fitting manner by protrusions 24′, 25′. By contrast, a form-fit between the first and the second base element 10, 20 of the first embodiment (see FIG. 7) occurs only by virtue of the gearing housing 30.

Figure 8:
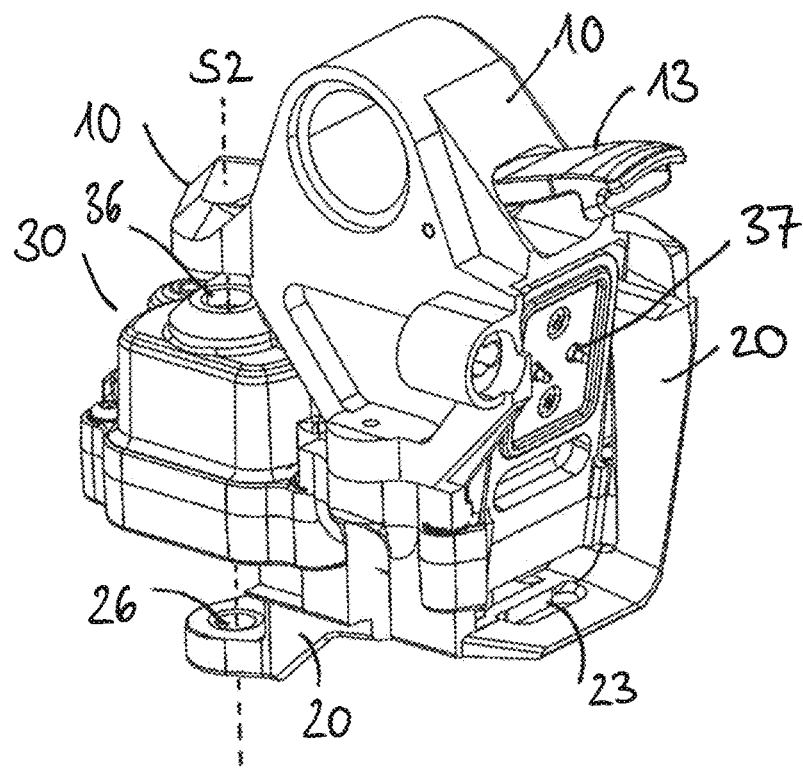
FIG. 8 shows a perspective inside view of a further embodiment.

The embodiments also differ in other ways. The internal lower pivot arm 56b below the second base element 20 in the first embodiment is mounted on the second pin stump 52b. The second base element 20 thus lies between the pivot arm 56b and the drive arm 81 (in FIG. 5b). By contrast, the internal lower pivot arm 56b in the second embodiment (in FIG. 8) is mounted above the second base element 20. To achieve this, the second base element 20 is configured such that there is sufficient space between the gearing housing 30 and the second base element 20, which allows the lower pivot arm 56b and the drive arm 81 (neither of which are shown in FIG. 8) to be received. The lower pivot arm 56b thus lies between the drive arm 81 and the second base element 20. The two embodiments do not differ in functionally relevant ways, which is why the same reference indicators are otherwise used.

Figure 9:
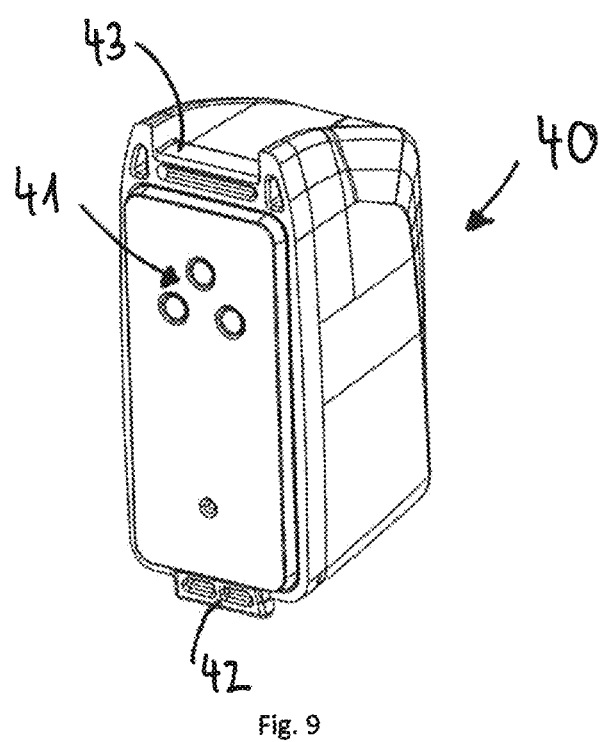
FIG. 9 shows a perspective view of a power source.

FIGS. 8 and 9, when viewed together, show how the battery 40 and the first and second base element 10, 20 may be mechanically connected, as well as how the battery 40 and the gearing housing 30, or the electric motor that is disposed in the housing 30, are electrically connected. To mechanically connect the battery 40 and the first and second base element 10, 20, first the fastening protrusion 42 of the battery 40 is inserted into the fastening opening 23 of the second base element 20, and then the fastening hook 13 that is rotatably mounted on the first base element 10 is brought to engage with the fastening counterpart piece 43 on the battery 40. The spring-tensioned fastening hook 13 and the counterpart piece 43 form a snap-fit mechanism. The battery 40 is supported directly on the second base element 20 of the stationary element and is held by the fastening hook 13.

When the battery 40 is mechanically connected to the first and second base element 10, 20, the electrical contacts 41 of the battery 40 come into contact with the electrical contacts 37 of the gearing housing 30. The electrical contacts on the housing 30 are configured as spring contact pins 37 which interact with the corresponding spring contact pin bases 41 on the battery 40. The arrangement with the spring contact pins 37 can be attached to the gearing housing 30 with two screws (see FIGS. 7 and 8). Once the battery 40 has been installed, electric power can be transmitted from the battery 40 via electrical contacts 41, 37 to the electric motor of the drive. Optionally, at least one mechanical anti-rotation safeguard rib could be disposed between the power source and the gearing housing to prevent any rotation of the battery relative to the gearing housing.

Figure 10:
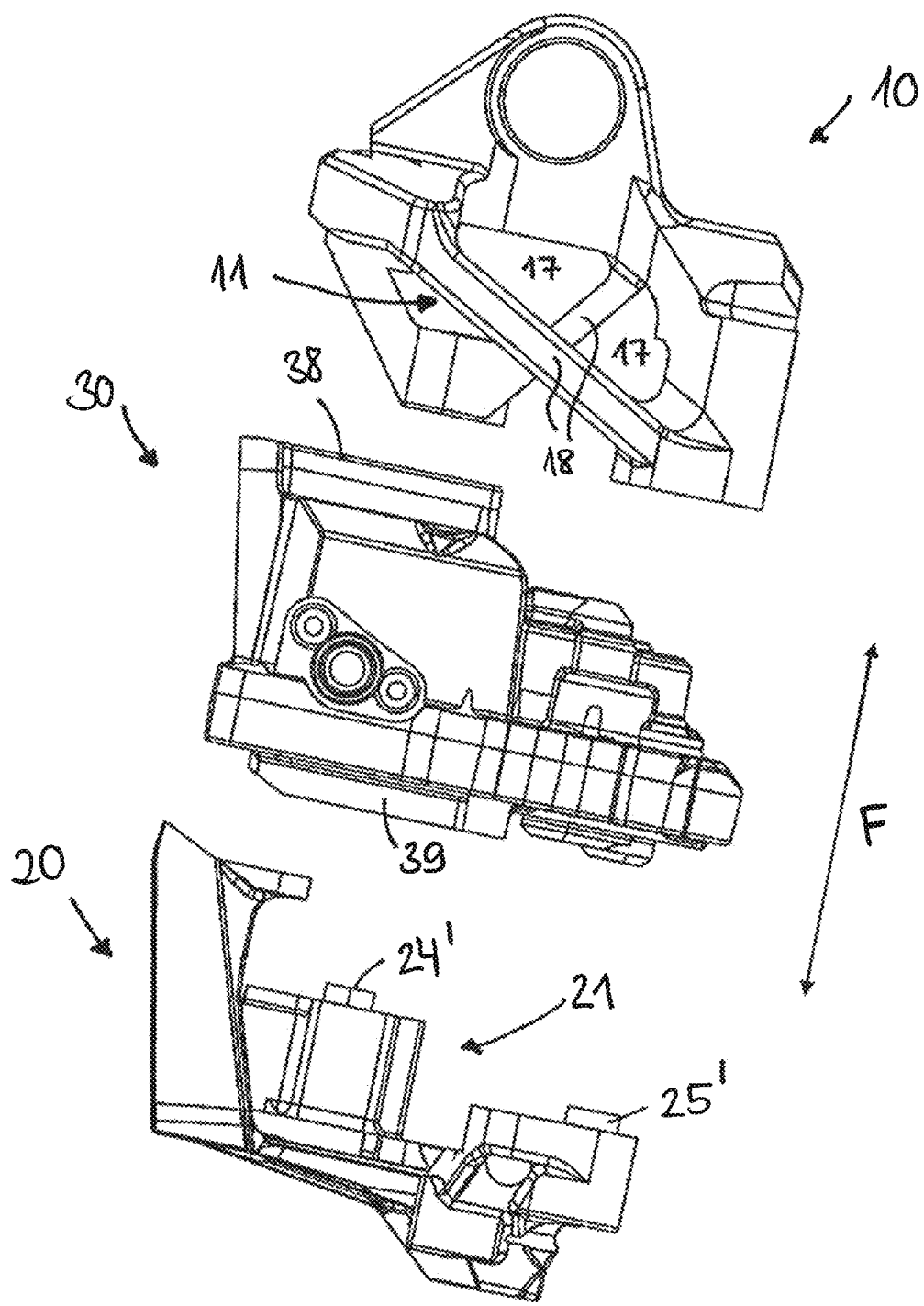
FIG. 10 shows an exploded outside view of FIG. 8.

FIG. 10 shows an exploded side view of the two base elements 10, 20 and the gearing housing 30. The three components 10, 20, 30 have been exploded in the joining direction F. Both the first holding protrusion 38 as well as this second holding protrusion 39 on the gearing housing 30 are visible. The two protrusions 38, 39 on the gearing housing 30 engage in a form-fitting and/or force-fitting manner in corresponding holding clearances in the base elements 10, 20, respectively. The two holding protrusions 38, 39 prevent rotation of the gearing housing 30 relative to the stationary element. The explanations made in the context of the first embodiment analogously apply to the second embodiment.

Figure 11A:
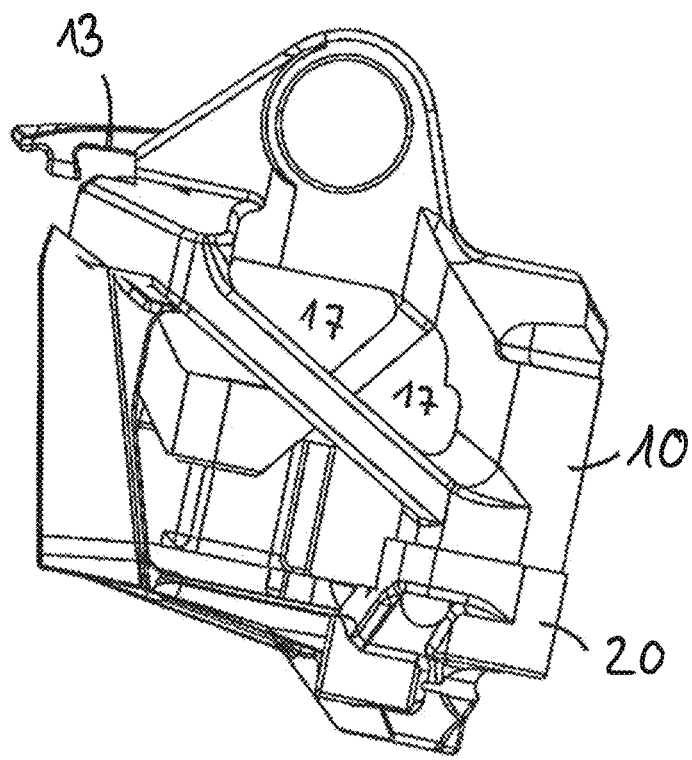
FIG. 11a shows an outside view of the assembled first and second base element.
Figure 11B:
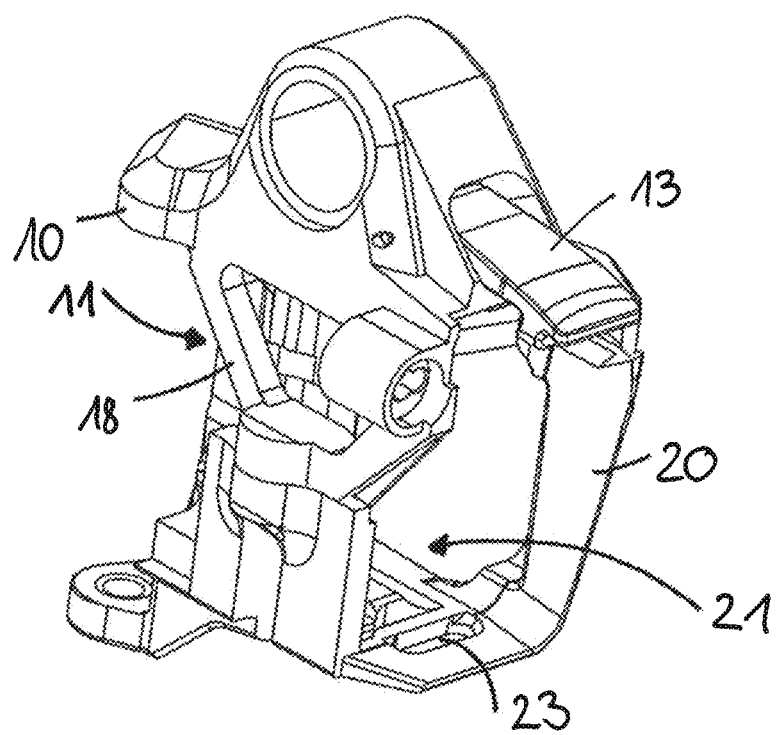

FIG. 11a shows a side view, and FIG. 11b shows a perspective rear view of the first and second base element 10, 20. The first base element 10, when viewed from the rear, has a vaguely inverted-U-shaped profile that is open at the bottom and which defines a first housing void 11. The first housing void 11 is suitable for at least partially receiving the gearing housing 30, specifically the first gearing housing part 31. The internal face contour of the first base element 10 is adapted to the external face contour of the first housing part 31. The first base element 10 has lateral reinforcement ribs 18 and recesses 17. The recesses 17 make functional parts of the gearing housing 30 accessible.

Moreover, the recesses 17 in the stationary element allow unimpeded transmission of radio signals for controlling the electromechanical derailleur in and out of the gearing housing 30. The second base element 20, when viewed from the rear, has a vaguely U-shaped profile that is open at the top. The second base element 20 defines a second housing void 21, which is suitable for at least partially receiving the gearing housing 30, specifically the second gearing housing part 32. The internal face contour of the second base element 20 is adapted to the external face contour of the second housing part 21. The first and second housing voids 11, 21 defined by the stationary element form the housing void in which the gearing housing 30 is at least partially disposed. The combined housing void and cage-like structure of the stationary element are particularly well-illustrated by FIGS. 11a and 11b.

The invention claimed is:

1. An electromechanical derailleur for mounting on a rear wheel axis of a bicycle, comprising:
    a stationary element for releasable assembly on a bicycle frame, and
    a movable element having a chain guide arrangement, and
    a pivoting mechanism which connects the movable element to the stationary element and is configured to enable movement of the movable element relative to the stationary element, and
    a gearing housing in which an electromechanical drive for driving the pivoting mechanism is received,
    wherein the stationary element is made of a metallic material and comprises at least one first base element for mounting on a bicycle frame and at least one second base element mounted on the first base element, the first and second base elements defining a housing void therebetween in which the gearing housing is at least partially disposed and the stationary element is configured such that a power source which is electrically connected to the electromechanical drive in the gearing housing may be fastened to the stationary element,
    wherein the gearing housing is plastic, and wherein the gearing housing is a separate housing from the first and second base elements and the gearing housing has on an exterior surface an electrical interface with electrical contacts configured to contact electrical contacts on the power source when the electromechanical derailleur is mounted on the rear wheel axis of the bicycle.

2. An electromechanical derailleur according to claim 1, wherein the stationary element has a fastener for the power source, said fastener comprising a rotatably mounted fastening hook and a fastening opening.

3. An electromechanical derailleur according to claim 1, wherein a fastening hook is disposed on the first base element, and a fastening opening is disposed in the second base element.

4. An electromechanical derailleur according to claim 3, wherein the power source has a fastening counterpart piece that is capable of engaging the fastening hook on the first base element, and a fastening protrusion which is capable of engaging the fastening opening in the second base element.

5. An electromechanical derailleur according to claim 1, wherein the power source is capable of being fastened to the rear of the stationary element.

6. An electromechanical derailleur according to claim 1, wherein the gearing housing is releasably disposed in the housing void of the stationary element.

7. An electromechanical derailleur according to claim 1, wherein the gearing housing is fixed in a form-fitting and/or force-fitting manner in the housing void when the first base element and the second base element are connected.

8. An electromechanical derailleur according to claim 1, wherein the gearing housing has a first housing part and a second housing part.

9. An electromechanical derailleur according to claim 1, wherein the pivoting mechanism comprises an external pivoting element which is rotatably connected to the stationary element by a first pivot pin and is rotatably connected to the movable element by a third pivot pin, and an internal pivoting element which is rotatably connected to the stationary element by a second pivot pin and is rotatably connected to the movable element by a fourth pivot pin.

10. An electromechanical derailleur according to claim 9, wherein the internal pivoting element comprises a first upper pivot arm and a second lower pivot arm.

11. An electromechanical derailleur according to claim 9, wherein the four pivot pins each define one pivot axis and are aligned so as to be substantially perpendicular to the rear wheel axis.

12. An electromechanical derailleur according to claim 9, wherein the first base element has a first upper pin receptacle and the second base element has a first lower pin receptacle for receiving the first pivot pin, and the first base element has a second upper pin receptacle and the second base element has a second lower pin receptacle for receiving the second pivot pin.

13. An electromechanical derailleur according to claim 12, wherein the pin receptacles of the first and second base element extend so as to be substantially perpendicular to the rear wheel axis.

14. An electromechanical derailleur according to claim 9, wherein the second pivot pin comprises a first upper pin stump and a second lower pin stump.

15. An electromechanical derailleur according to claim 9, wherein a drive arm is connected in a rotationally fixed manner to an output shaft of the electromechanical drive which moves the movable element in response to operation of the electromechanical drive.

16. An electromechanical derailleur according to claim 15, wherein the output shaft extends coaxially with the second pivot pin, and the first and second pin stumps.

17. An electromechanical derailleur according to claim 9, wherein a restoring spring, which is mounted about the fourth pivot pin, pretensions the movable element relative to the stationary element.

18. The electromechanical derailleur according to claim 1, wherein the electromechanical drive is fully enclosed by the plastic of the gearing housing.

19. The electromechanical derailleur according to claim 18, further comprising a transmitter, wherein the transmitter is enclosed by the plastic of the gearing housing.

* * * * *